Figure 2:
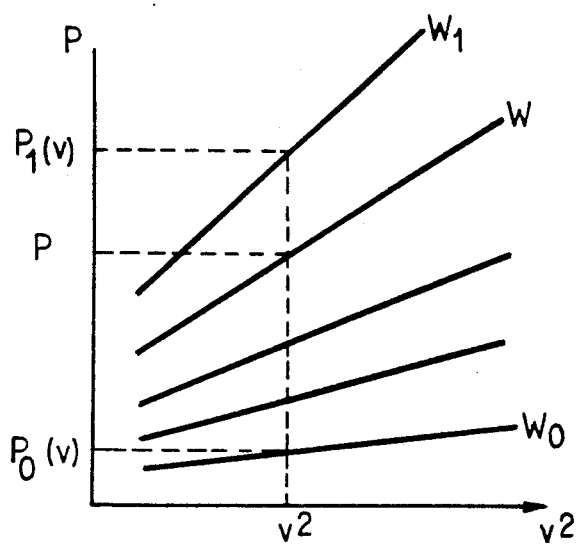

United States Patent [19]
Pomies

[11] Patent Number: 5,167,287
[45] Date of Patent: Dec. 1, 1992

[54] PROCESS AND DEVICES FOR DYNAMIC MEASUREMENT OF A LOAD IN DISPLACEMENT IN A VERTICAL PLANE

[75] Inventor: Jean-Pierre Pomies, Montargis, France

[73] Assignee: Association Pour La Rationalisation Et La Mecanisation De L'Expoloitationforestiere A.P.M.F.F., France

[21] Appl. No.: 832,652

[22] Filed: Feb. 11, 1992

Related U.S. Application Data
[63] Continuation of Ser. No. 523,813, May 16, 1990.

[30] Foreign Application Priority Data

May 17, 1989 [FR] France ............... 89 06423

[51] Int. Cl.$^5$ ............... G01G 19/08; G01G 19/10
[52] U.S. Cl. ............... 177/1; 177/139; 177/141; 177/146; 177/152
[58] Field of Search ............... 177/139, 145, 151, 152, 177/141

[56] References Cited
U.S. PATENT DOCUMENTS
4,230,196 10/1980 Snead .
4,919,222 4/1990 Kyrtsos et al. ............... 177/139

FOREIGN PATENT DOCUMENTS
0246363 8/1979 European Pat. Off. .
8802849 4/1987 World Int. Prop. O. .

OTHER PUBLICATIONS
Abstract—Japan—No. 60-80721 (A).

Primary Examiner—George H. Miller, Jr.
Attorney, Agent, or Firm—Hoffman, Wasson & Gitler

[57] ABSTRACT

The invention relates to a process and device for dynamic measurement of a load in displacement in a vertical plane, this load undergoing a force exerted upward. The value of the load is determined from its displacement speed in a determined portion of its travel and from a parameter exhibiting a relation with said force in this same travel position. The device comprises a sensor (4) of the hoisting speed of the load in a determined portion of its travel, means (3) for measuring the upward force undergone by the load when it is being hoisted in a determined portion of its travel, and processing means (6) to deduce the value of said load from the displacement speed of the load and of said force.

10 Claims, 2 Drawing Sheets

PROCESS AND DEVICES FOR DYNAMIC MEASUREMENT OF A LOAD IN DISPLACEMENT IN A VERTICAL PLANE

This is a continuation of copending application Ser. No. 07/523,813 filed on May 16, 1990.

This invention relates to a process and devices for dynamic measurement of a load in displacement in a vertical plane.

It is often useful when hoisting a load, for example to transfer it from the ground to a transport means, also to weigh it. Thus, it is possible to know, cumulatively, the amount of material loaded in said transport means or the total amount handled during a given period such as a shift, day or week.

Knowledge of the loads handled is necessary, for example, in the field of timber hauling or in the mining field to assure a good management of the operation.

The drawback of conventional weighings resides in the fact that it is necessary to interrupt hoisting each load to immobilize it to proceed to a meaningful measurement and such an interruption of the hoisting constitutes a loss of time detrimental to the efficiency of the handling operation.

Further, for a certain number of operations, for example, in the mining field, it is highly desirable to perform two measurements. Actually, it rather often happens that the nature and characteristics of the extracted material do not allow the transport means to be emptied totally, for example, a bucket mounted on a light rail motor tractor. In this case, if it is desired to know the amount of material actually dumped by this bucket, for example, into the truck which will take it to the processing site, it is necessary to measure the total load carried by the bucket, then the amount of material not dumped during emptying the bucket to deduce the amount actually dumped.

This invention aims at eliminating these drawbacks by providing a process and devices making it possible to perform such weighings without interrupting the handling operations.

For this purpose, the invention has first as its object a process for dynamic measurement of a load in displacement in a vertical plane, this load undergoing a force exerted upward, characterized in that the value of said load is determined from its speed of displacement in a determined portion of its travel and from a parameter exhibiting a relation with said force in this same portion of travel.

The applicant actually found that there was a relation between the value of the load and the values of the force and speed so that the first can be deduced from these two parameters.

For this purpose, for two known loads, a calibration can be made taking in two displacement speeds in a vertical plane for each of the two loads which thus constitute the standard loads.

Actually, it has been found that the characteristic curves of the vertical force as a function of the square of the displacement speed are straight lines whose coefficients depend on the load.

Consequently, if two displacements are made at two different speeds with first standard load $W_0$ (for example, average of hoisting empty), it is possible to plot the straight line characteristic of this first standard load $W_0$ in plane ($v^2$, f). If a start is again made with two different speeds for a second standard load $W_1$ (for example, average of hoisting full), it is possible to plot in the same plane the characteristic straight line corresponding to this second standard load $W_1$.

Of course, this calibration is made once for all when the device used for using the invention is put into operation.

Actually, it was further found that in case the displacement of the load is made with a machine equipped with a hydraulic cylinder, the load varies linearly, for a given speed, with the pressure existing in said cylinder.

Therefore it is possible to determine from calibration pressures $P_0(v)$ and $P_1(v)$ existing in the cylinder and corresponding to standard loads $W_0$ and $W_1$ for measured hoisting speed v, and to deduce actual load W from these pressures $P_0(v)$ and $P_1(v)$ and from pressure P measured in the cylinder.

This actual load can then be calculated by the relation:

$$\frac{W_1 - W}{W_1 - W_0} = \frac{P_1(v) - P(v)}{P_1(v) - P_0(v)}$$

The applicant also found that, when the load to be measured was handled with a hydraulic cylinder, the calibration method made it possible to integrate, at descent, the measurement of the vertical force in the measurement of the single displacement speed. For this purpose, it suffices to maintain the sections of the hydraulic circuit of the cylinder at a constant value when the load is in the determined portion of the descent where the speed measurement is being made.

In this case, first of all, in this determined portion of the descent, the measurement is made of the speed of at least two standard loads. The curve resulting from these measurements is a straight line on which it is possible to read directly the measurement of a load as a function of the square of the speed.

Thus, by knowning speeds $V_0$ and $V_1$ corresponding to standard loads $W_0$ and $W_1$, it is possible to deduce actual load W from speed v measured in the determined portion of the descent by the relation $$\frac{W_1 - W}{W_1 - W_0} = \frac{v_1^2 - v^2}{v_1^2 - v_0^2}$$

An interesting application of the invention therefore is to make possible a double measurement of a handling machine, on the one hand, at hoisting, after filling, and on the other hand, at descent, after emptying, and to deduce the load actually dumped.

In the case of a load not strictly connected with hoisting means, it is possible, to eliminate the influence of oscillations of this load, to operate in the following manner:

perform a series of measurements during the displacement of the determined portion;

calculate the average measurement of measurement 1 to measurement n;

calculate the average measurement of measurement 2 to measurement n+1;

compare the second average to the first;

retain this second average if its difference from the first is less than a given threshold;

if not, calculate the average measurement of measurement 3 to measurement n+2, compare it to the second average and retain it or calculate a fourth average of measurement 4 to measurement n+3, taking the difference with the third average, etc., until arriving at an average whose difference from the preceding average is less than the given threshold.

This invention also has at its object a device for using the process disclosed above for the measurement of a load handled with a hydraulic cylinder, characterized in that it comprises a sensor of the displacement speed of the load at hoisting, means for measuring the pressure in the cylinder and means for processing the data provided by said sensor and said measuring means to deduce the actual value of the load.

In an embodiment of the invention, the speed sensor is an electromagnetic sensor made to interact with a metal part, the sensor and said part being in relative displacement during displacement of the load, the displacement speed being deduced from the period of passage of the metal part in front of the sensor.

The invention also has as its object a device for the measurement at descent of a load handled with a hydraulic cylinder characterized in that it comprises means for locking at a constant value of the sections of the hydraulic circuit of the cylinder, a sensor of the displacement speed of the load at descent, and means for processing the data provided by said sensor to deduce the value of the load.

Finally, the invention has as its object a device characterized in that it comprises means to integrate the measurement made of a load at its hoisting and that made at its descent and means to deduce the difference.

Figure 3:
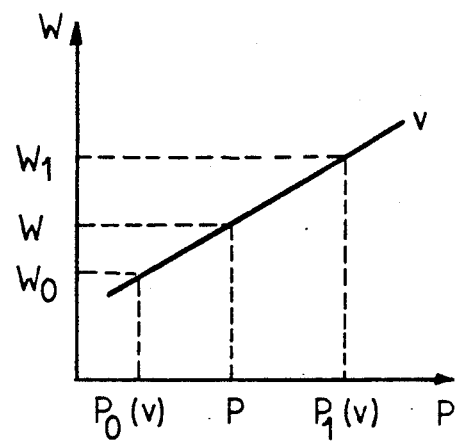
Figure 1:
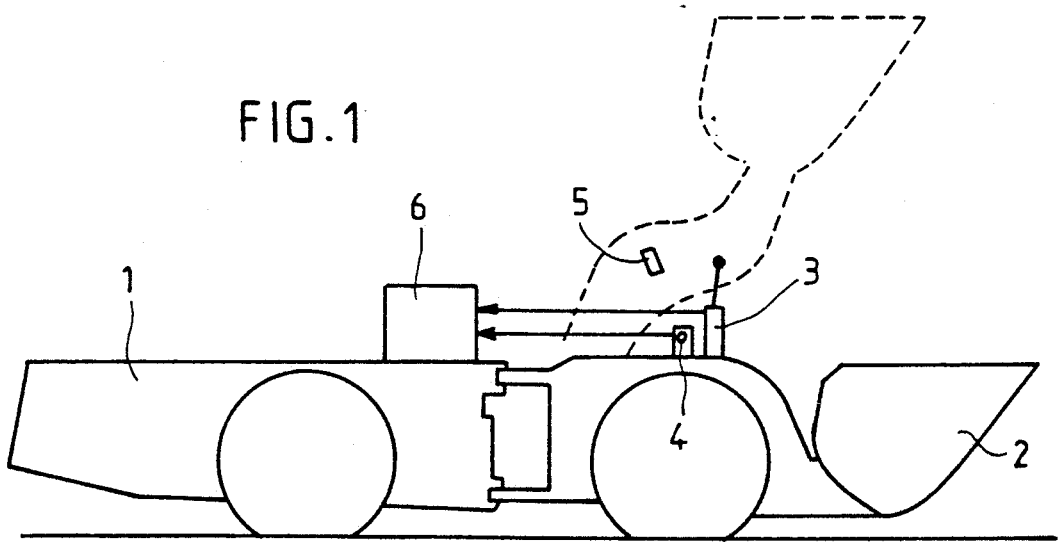
Figure 4:
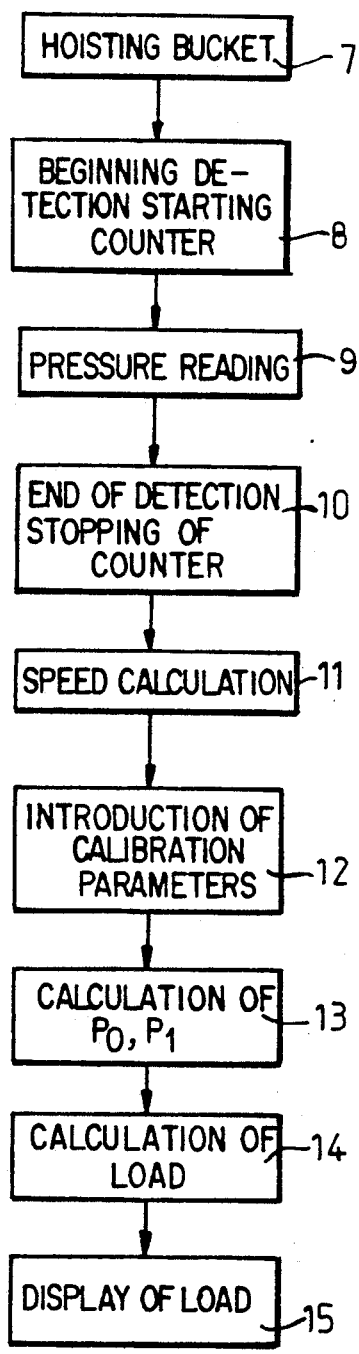
Figure 5:
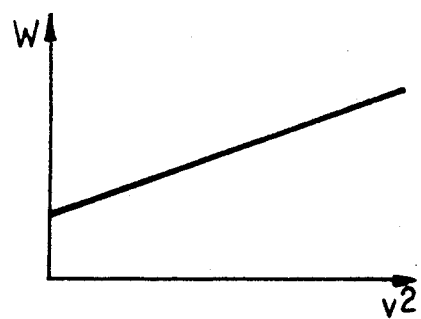
Figure 6:
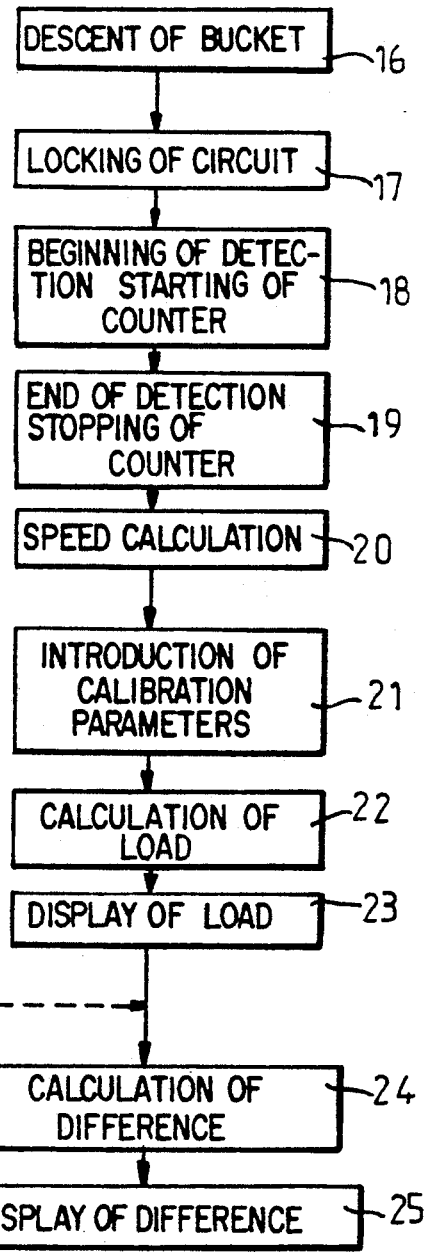

There will now be described, by way of nonlimiting examples, two variant embodiments of the invention with reference to the accompanying diagrammatic drawings in which:

FIG. 1 represents, in side view, a hoisting machine operated by hydraulic cylinder, and equipped with a device according to the invention, FIG. 2 represents the characteristic curves of the hoisting machine in plane ($v^2$, P), FIG. 3 represents the variation of the load as a function of the pressure in the cylinder for a given speed, FIG. 4 is a flow chart of the process according to the invention applied to the measurement of a load when it is being hoisted, FIG. 5 represents the variation of the load as a function of the speed of descent, FIG. 6 is a flow chart of the process according to the invention applied to the measurement of a load during its descent.

FIG. 1 represents a hoisting machine 1 equipped with a bucket 2 intended, for example, for loading ore.

The invention aims at measuring the load of ore contained in bucket 2 while it is being hoisted from the position represented in solid lines to the position represented by broken lines.

This hoisting is performed with a cylinder 3.

Further, an electromagnetic sensor 4 is mounted stationary on machine 1, and a metal part 5 is placed on the support lever of bucket 2, so that during hoisting of the latter, part 5 passes in front of sensor 4.

At the moment when part 5 begins to pass in front of sensor 4, the latter detects a variation of the magnetic field, then a new variation when part 5 has finished passing in front of it.

The value of the pressure in cylinder 3 as well as the output of sensor 4 are applied at the input of a processing unit 6.

From the period of passage of metal part 5 in front of sensor 4, the processing unit deduces the hoisting speed and deduces the value of the load from this speed and from the pressure in cylinder 3 in the way that will now be described.

Referring to FIG. 2, it can be seen that for a given load, the pressure in the cylinder varies linearly as a function of the square of the hoisting speed.

Consequently, if the family of characteristic curves at constant load W in plane ($v^2$, P) is plotted, the set of straight lines represented is obtained, and it follows that, if hoisting speed v and therefore $v^2$ are known as well as pressure P in the cylinder during hoisting of a load, it is possible, by calibration, to deduce this load W from the diagram of FIG. 2.

Actually, it was also found that for a given hoisting speed v, pressure P in the cylinder varied linearly as a function of load W as represented in FIG. 3.

Calibration of the device consequently is simple. It is performed successively with two standard loads $W_0$ and $W_1$.

For each load, two hoistings at two different speeds are performed, determining the corresponding pressurs, which makes it possible to plot the characteristic straight lines $W_0$ and $W_1$ of FIG. 2, and to deduce their coefficients.

When, later, a measurement is made, speed v and pressure P(v) are determined.

Pressures $P_0(v)$ and $P_1(v)$ can be deduced from speed v and coefficients of straight lines $W_0$ and $W_1$.

FIG. 3 then shows that it is possible immediately to obtain load W by the relation:

$$\frac{W_1 - W}{W_1 - W_0} = \frac{P_1(v) - P(v)}{P_1(v) - P_0(v)}$$

In practice, once the calibration has been made, processing unit 6 functions as represented in FIG. 4.

Hoisting of bucket 2 begins at 7.

At 8, sensor 4 detects the start of the passage of metal part 5 in front of it, which causes the start of a counter contained in unit 6.

During counting, the value of the pressure in cylinder 3 at 9 is recorded or a set of values is recorded from which an average is taken.

At 10, sensor 4 detects the end of the passage of metal part 5, which causes stopping of the counter.

The hoisting speed can then be calculated at 11 by knowing the length of metal part 5 and the value contained in the counter.

The calibration parameters, i.e., the coefficients of straight line $W_0$ and $W_1$, are then introduced at 12, and pressures $P_0(v)$ and $P_1(v)$ are calculated at 13 from the speed calculated at 11 and from the calibration parameters.

It is then possible to calculate the load by the above formula at 14 and to display this load at 15.

FIGS. 5 and 6 give another embodiment for dynamic measurement of a load during its descent.

FIG. 5 shows the variation curve of the load as a function of the square of the descent speed, obtained from the descent speed of at least two standard loads, the sections of the hydraulic circuit being locked at a constant given value.

The descent of bucket 2 begins at 16.

The sections of the hydraulic circuit are locked at 17 at the same value as during the calibration.

At 18 sensor 4 detects the beginning of the passage of metal part 5 in front of it, which causes starting of a counter contained in unit 6.

At 19, sensor 4 detects the end of the passage of metal part 5 which causes stopping of the counter and the descent speed can then be calculated at 20.

The calibration parameters are introduced at 21 and the load is calculated at 22.

This load is displayed at 23 and, in connection with the figure obtained at 15 during the preceding hoisting displacement, the load actually dumped during emptying of bucket 2 is calculated at 24 and displayed at 25.

Different variants and modifications can, of course, be introduced into the above embodiments without thereby going outside the scope or spirit of the invention.

I claim:

1. A process for the dynamic measurement of a load in displacement in a vertical plane, this load undergoing a force exerted upward, characterized in that the value of this load is determined from its displacement speed in a determined portion of its travel and of a parameter exhibiting a relation with said force in this same portion of travel, wherein the values of the force and speed are processed from a calibration of at least two standard loads for at least two speeds, and further, at descent, the measurement of a load remaining whose upward displacement is performed by a machine equipped with a hydraulic cylinder, wherein in a determined portion of the travel of descent, the sections of the hydraulic circuit of the hydraulic cylinder are maintained at a constant given value pressure and the displacement speed of this load is measured.

2. A process according to claim 1, wherein pressures $P_0(v)$ and $P_1(v)$ corresponding to standard loads $W_0$ and $W_1$ for measured displacement speed v are determined from the calibration, and actual load W is deduced from pressure $P_0(v)$ and $P_1(v)$.

3. A process according to claim 2, wherein the actual load is calculated by the relation $$\frac{W_1 - W}{W_1 - W_o} = \frac{P_1(v) - P(v)}{P_1(v) - P_o(v)}$$

4. A process according to claim 1, wherein the results of the value of the speed measured from a calibration of the speeds of at least two standard loads are processed.

5. A process according to claim 4, wherein speeds $v_0$ and $v_1$ corresponding to standard loads $W_0$ and $W_1$ in said portion of the travel are determined from the calibration, and actual load W is deduced from measured speed v.

6. A process according to claim 5, wherein the actual load is calculated by the relation $$\frac{W_1 - W}{W_1 - W_o} = \frac{v_1^2 - v^2}{v_1^2 - v_o^2}$$

7. A process according to claim 1, wherein to obtain at least one of the values to be measured, a series of measurements is made, a sequence of moving averages is calculated from these measurements and there is taken at the value the first average obtained whose difference from the preceding average is less than a determined threshold.

8. A device for utilizing the process according to claim 7, wherein it comprises a sensor (4) of the descent speed of the load in a determined portion of its travel and processing means (6) to deduce the value of the load from the measured descent speed.

9. A device according to claim 8, wherein the speed sensor is an electromagnetic sensor made to interact with metal part (5), the sensor and said metal part being in relative displacement during displacement of the load, this displacement speed being deduced from the period of passage of the metal part in front of the sensor.

10. A device for carrying out the process for the dynamic measurement of a load in displacement in a vertical plane, this load undergoing a force exerted characterized in that the value of this load is determined from its displacement speed in a determined portion of its travel and of a parameter exhibiting the relation with said force in this same portion of travel in which the machine carrying the load whose value is to be measured is a bucket (2) mounted on jointed arms maneuvered by the hydraulic cylinder, said bucket being filled in low position, being emptied in high position and then coming back to low position to be filled again, wherein it comprises, on the first part, means able to measure, at hoisting and at passage during a determined portion of the travel of the bucket, the speed of hoisting of the full bucket, means able to measure, under the same conditions, the pressure in the cylinder, and processing means to deduce the value of the load contained in said bucket from the speed and measured pressure, and on the second part, means able to measure, at descent and at the passage in a determined portion of the travel of the bucket, the speed of said bucket, means able to maintain sections of the hydraulic circuit at a constant given value pressure when said bucket is in the measuring zone, and processing means to deduce the load remaining in the bucket from this speed, and on the third part, means to deduce the value of the load actually discharged from the bucket from the value of the load at hoisting of the bucket and from the value of the load at its descent.

* * * * *